United States Patent
Zuo et al.

(10) Patent No.: US 9,394,876 B2
(45) Date of Patent: Jul. 19, 2016

(54) HIGH-EFFICIENCY ENERGY GENERATOR FOR HARNESSING MECHANICAL VIBRATION POWER

(75) Inventors: Lei Zuo, Nesconset, NY (US); Gopinath Reddy Penamalli, Rochester Hills, MI (US); John Wang, East Setauket, NY (US); Rui He Zheng, Flushing, NY (US); Xiao Hui Lei, College Point, NY (US); Jorge F. Lam-Ki, Bay Shore, NY (US); Zhongjie Li, Stony Brook, NY (US); Teng Lin, Lake Grove, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 509 days.

(21) Appl. No.: 13/447,908

(22) Filed: Apr. 16, 2012

(65) Prior Publication Data

US 2013/0008157 A1    Jan. 10, 2013

Related U.S. Application Data

(60) Provisional application No. 61/476,019, filed on Apr. 15, 2011.

(51) Int. Cl.
*F03B 13/18* (2006.01)

(52) U.S. Cl.
CPC . *F03B 13/18* (2013.01); *Y02E 10/38* (2013.01)

(58) Field of Classification Search
CPC .......... F03B 13/12; F04B 35/00; F16H 37/06; F03G 7/08; F03G 7/00; H02K 7/1853; H02K 11/0094; H02K 35/02; H02K 35/04; H02K 53/00
USPC ......... 310/339; 418/191; 290/1 C, 53; 60/497
See application file for complete search history.

(56) References Cited

U.S. PATENT DOCUMENTS 4,130,064 A * 12/1978 Bridwell ................. F04B 17/00
                                                                104/154
4,211,078 A *  7/1980 Bass ......................... F03G 7/08
                                                                 185/27

(Continued)

FOREIGN PATENT DOCUMENTS

CN         201236776 Y    5/2009
DE      19732166 A1 *  2/1999   ............... F03G 7/08

(Continued)

OTHER PUBLICATIONS

Energy Harvesting System Design for Rail Road Safety by Abolfazl Pourghodrat Dated Aug. 11, 2011.*

(Continued)

*Primary Examiner* — Thomas Denion
*Assistant Examiner* — Shafiq Mian
(74) *Attorney, Agent, or Firm* — Scully, Scott, Murphy & Presser, P.C.

(57) ABSTRACT

An energy generating device utilizing mechanical vibration power is provided. The energy generating device includes a first body for reciprocating according to vibration motions; an anchored second body; a rack coupled to one of the first body and the anchored second body; a gear assembly engaged with the rack and coupled to the other one of the first body and the anchored second body such that the gear assembly drives a generator via a rotational movement in a single direction according to each of upward and downward movement of the rack relative to the gear assembly; and the generator engaged with the gear assembly for receiving the rotational movement output from the gear assembly and outputting a direct current according to the rotational input from the gear assembly.

13 Claims, 10 Drawing Sheets

(56) References Cited

U.S. PATENT DOCUMENTS

| | | | |
|---|---|---|---|
| 4,392,060 A | 7/1983 | Ivy | |
| 5,279,400 A * | 1/1994 | Riggle et al. | 192/45.016 |
| 6,362,534 B1 * | 3/2002 | Kaufman | F03G 7/08 290/1 R |
| 6,376,925 B1 * | 4/2002 | Galich | F03G 7/08 290/1 R |
| 7,148,581 B2 * | 12/2006 | Hershey | H02N 1/08 290/1 R |
| 7,361,999 B2 * | 4/2008 | Yeh | 290/1 R |
| 7,391,123 B2 * | 6/2008 | Rome | 290/1 R |
| 7,812,508 B2 | 10/2010 | Abramovich et al. | |
| 7,841,177 B1 | 11/2010 | Detwiler | |
| 8,334,603 B2 * | 12/2012 | Daya | B61C 3/00 290/1 C |
| 2006/0076461 A1 * | 4/2006 | DeRose | B61K 9/00 246/122 R |
| 2007/0297903 A1 * | 12/2007 | Morris | 416/132 A |
| 2009/0072540 A1 * | 3/2009 | McCague et al. | 290/53 |
| 2011/0084488 A1 * | 4/2011 | Eder et al. | 290/53 |

FOREIGN PATENT DOCUMENTS

| | | |
|---|---|---|
| GB | 2461792 A | 1/2010 |
| JP | 6-171577 | 6/1994 |
| RU | 2221933 C2 | 1/2004 |

OTHER PUBLICATIONS

Pourghodrat, Abolfazl, et al., Improving an energy harvesting device for railroad safety applications, Active and Passive Smart Structures and Integrated Systems 2011, Proc. of SPIE vol. 7977, 79770U, (pp. 9).

Pourghodrat, Abolfazl, Energy Harvesting Systems Design for Railroad Safety, 2011, Mechanical (and Materials) Engineering—Dissertations, Theses and Student Research, Paper 23, University of Nebraska—Lincoln, (pp. 131).

Phillips, Kyle J., Simulation and Control System of a Railroad Track Power Harvesting Device, 2011, Mechanical (and Materials) Engineering—Dissertations, Theses, and Student Research, Paper 26, University of Nebraska—Lincoln, (pp. 171).

International Search Report and Written Opinion dated Feb. 14, 2013 received from the Russian Patent Office from related Application No. PCT/US2012/043953.

* cited by examiner

US 9,394,876 B2

HIGH-EFFICIENCY ENERGY GENERATOR FOR HARNESSING MECHANICAL VIBRATION POWER

PRIORITY

This application claims priority to U.S. Provisional Application No. 61/476,019, filed with the U.S. Patent and Trademark Office on Apr. 15, 2011, the entire contents of which are incorporated herein by reference.

BACKGROUND OF THE INVENTION

1. Field of the Invention

The present invention relates generally to an apparatus for harnessing mechanical vibration power, and more particularly, and apparatus and method for generating electrical energy via a unidirectional rotation by harnessing mechanical vibration.

2. Description of the Related Art

In an ocean wave, water molecules follow an orbital path such that the surface of the water moves in a wave pattern periodically rising to a wave crest above a still water level and dropping into a wave trough below a still water level. The kinetic energy of ocean wave motion is tremendous. An average 4-foot, 10-second wave can produce 26 MW of energy per mile of coast. Energy from ocean waves alone can supply all of mankind's electricity needs. Wave power is renewable, green, pollution-free and environmentally invisible.

Although wave energy has a much larger power density and has more capacity than solar Photo Voltaic (PV) or wind turbine energy sources, wave energy technology is at a nascent stage. There are three basic methods to convert wave energy into electricity. A first method is a float system (e.g. a power buoy, a sea snake, a power oyster, or a wing), which uses the rise and fall of ocean swells to drive hydraulic pumps that power an electrical generator. A second method is based on an oscillating water column principle and a bi-directional airflow turbine. A third method relies on a channel structure to concentrate a plurality of waves, to drive the waves into an elevated reservoir and generate electricity using hydro turbine technology.

The float system method generally provides a higher efficiency than the other two methods. However, high-pressure hydraulic fluid used in the float system method causes reliability and leak problems. For example, these problems caused an offshore wave farm in Portugal to shut down only after two months of operation.

Efficiency and reliability are key challenges of ocean wave energy generation. Accordingly, there is a need for a method and apparatus for harvesting ocean wave energy that is both efficient and reliable.

SUMMARY OF THE INVENTION

Accordingly, an aspect of the present invention is to address the above and other problems, and to provide an apparatus and method for generating a unidirectional rotation through harnessing mechanical vibration power.

According to an aspect of the present invention an energy generating device utilizing wave motion is provided. The energy generating device includes a buoy for floating in a liquid body and reciprocating according to wave motions of the liquid body; an anchor; a rack coupled to one of the buoy and the anchor; a gear assembly engaged with the rack and coupled to the other one of the buoy and the anchor such that the gear assembly drives a generator via a rotational movement in a single direction according to each of upward and downward movement of the rack relative to the gear assembly; and the generator engaged with the gear assembly for receiving the rotational movement output from the gear assembly and outputting a direct current according to the rotational input from the gear assembly.

According to another aspect of the present invention an energy generating shock absorber device is provided. The energy generating shock absorber device includes a hollow first outer body having an open end; a second outer body at least partially inserted into the open end of the first outer body for linearly reciprocating with respect to the first outer body; a rack coupled to one of the first outer body and the second outer body; a gear assembly engaged with the rack and coupled to the other one of the first outer body and the second outer body such that the gear assembly drives a generator via a rotational movement in a single direction according to each of upward and downward movement of the rack relative to the gear assembly; and the generator engaged with the gear assembly for receiving the rotational movement output from the gear assembly and outputting a direct current according to the rotational input from the gear assembly.

According to another aspect of the present invention, an energy generating device utilizing rail deformation in a railway system is provided. The energy generating device includes a rail mount coupled to at least one of a railway track and a railway tie such that the rail mount moves according to a deformation of the railway track caused by passing railway cars; an anchor mount coupled to a fixed body below the rail mount; a rack coupled to one of the rail mount and the anchor mount; a gear assembly engaged with the rack and coupled to the other one of the rail mount and the anchor mount such that the gear assembly drives a generator via a rotational movement in a single direction according to each of upward and downward movement of the rack relative to the gear assembly; and the generator engaged with the gear assembly for receiving the rotational movement output from the gear assembly and outputting a direct current according to the rotational input from the gear assembly.

BRIEF DESCRIPTION OF THE DRAWINGS

The above and other aspects, features and advantages of certain embodiments of the present invention will be more apparent from the following detailed description taken in conjunction with the accompanying drawings, in which.

DETAILED DESCRIPTION OF EMBODIMENTS OF THE PRESENT INVENTION

The following detailed description of the preferred embodiments will be made with reference to the accompanying drawings. In the description provided herein, an explanation of related functions or constructions known in the art are omitted for the sake of clarity in understanding while avoiding obscuring the concept with unnecessary detail.

Figure 1:
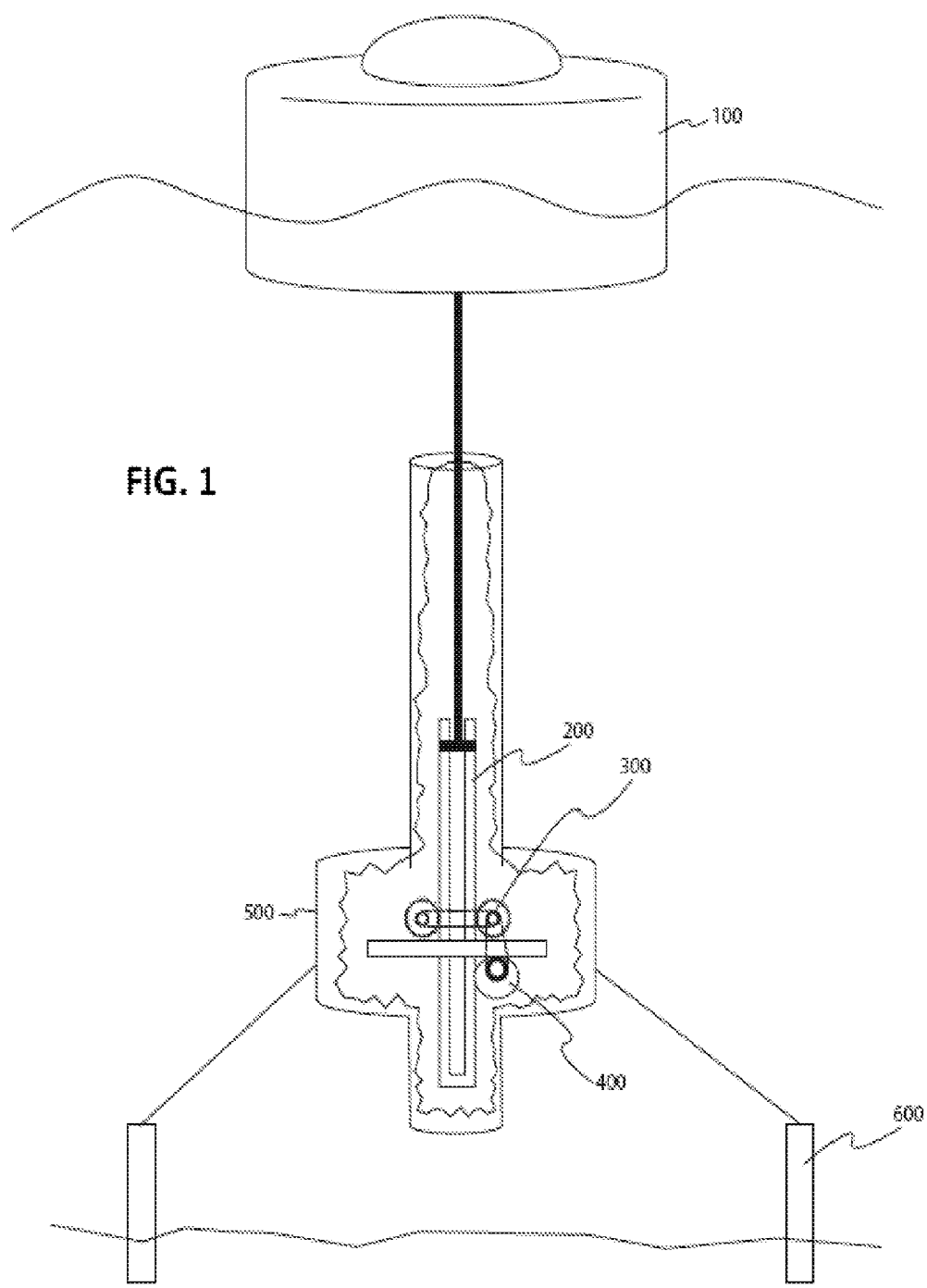
FIG. 1 is a diagram illustrating an energy generating device utilizing wave motion according to an embodiment of the present invention.

FIG. 1 is a diagram illustrating an energy generating device utilizing wave motion according to an embodiment of the present invention.

Referring to FIG. 1, the energy generating device includes a buoy 100, a rack 200, a gear assembly 300, a generator 400, an enclosure 500, and an anchor 600.

The buoy 100 is constructed to float near or at a surface of moving liquid body, such as an ocean. When the buoy 100 is placed in a moving body of water such as the ocean, the buoy 100 rises and falls according to wave motions of the water.

The buoy 100 is connected to a rack 200 positioned below the buoy 100. The rack 200 reciprocates vertically according to the movement of the buoy 100. The rack 200 is movably connected with a gear assembly 300, which is connected with a generator 400. The gear assembly 300 and generator 400 are anchored by an anchor 600.

The anchor 600 may be a fixed anchor resting upon or attached to a fixed element, such as the ocean floor at the a bottom of the body of water, or the anchor 600 may be a virtual anchor that is not attached to a fixed element, but is able to move within the body of water such that motion of the anchor 600 is less than that of the rise and fall of the buoy 100 according to the wave motions of the water. For example, for oceanic waves, the range of an elliptical motion of water near the surface of the water may be greater than a range of a corresponding elliptical motion below the surface of the water. Accordingly, when the anchor 600 is a virtual anchor, the buoy 100 still moves relative to the gear assembly 300 and the anchor 600.

As the buoy 100 rises and falls according to the wave motions of the water, the rack 200 connected to the buoy 100 reciprocates vertically with respect to the gear assembly 300. The gear assembly 300 engages with the rack 200 such that the vertical reciprocation of the rack 200 is translated into a unidirectional rotation used to drive to the generator 400, which outputs electrical energy.

The electrical energy output by the generator 400 may be used immediately to provide power to an electrical device, to charge an energy storage device, and/or provide electrical energy to be transported to a remote destination, such as a power plant.

The gear assembly 300 is constructed such that it outputs rotation in the same direction when the rack 200 reciprocates both upwards and downwards, thereby driving the generator 400 through both of the upwards and downwards movement of the buoy.

Figure 2:
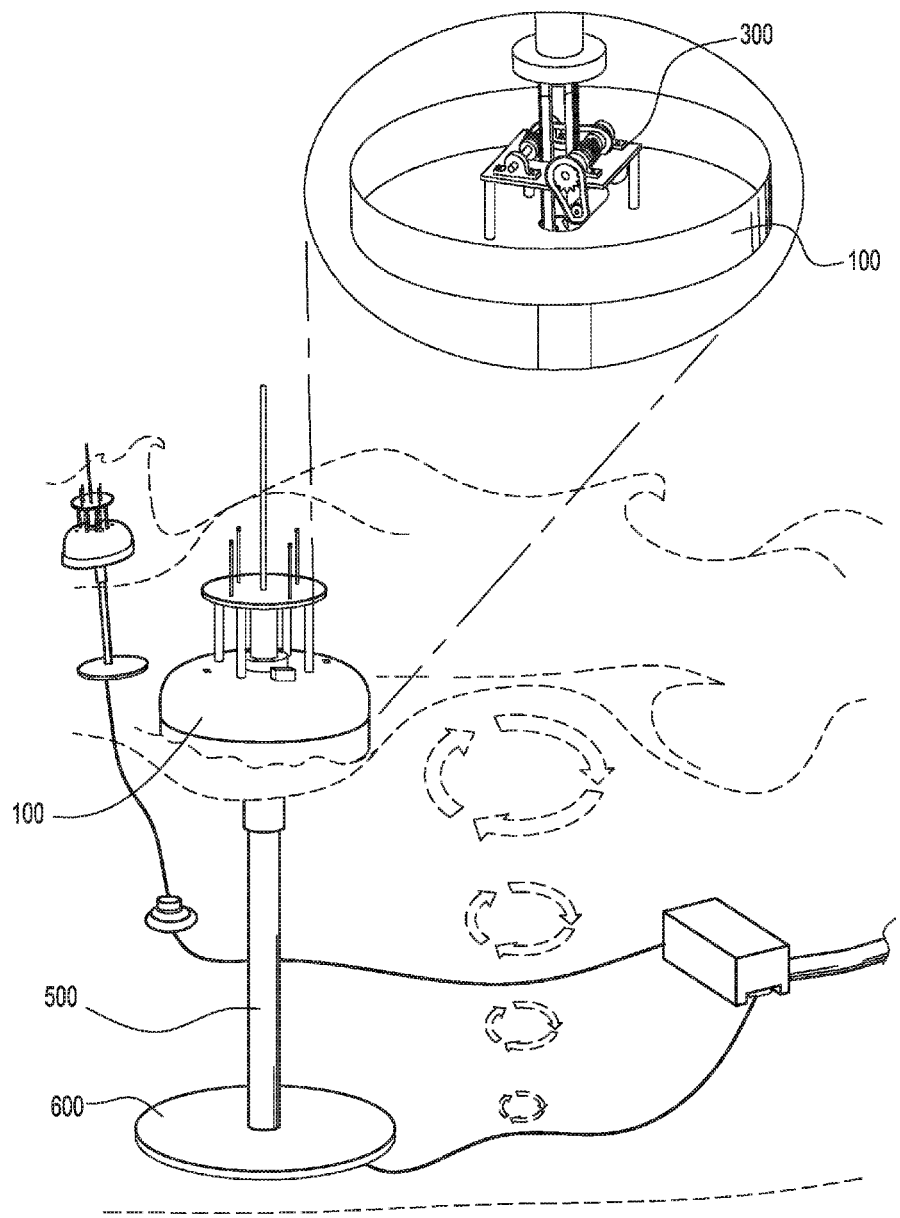
FIG. 2 is a diagram illustrating an energy generating device utilizing wave motion according to another embodiment of the present invention.

FIG. 2 is a diagram illustrating an energy generating device utilizing wave motion according to another embodiment of the present invention.

Referring to FIG. 2, in contrast to the embodiment shown and described with reference to FIG. 1, the gear assembly 300 is included within the buoy 100, while a rack (not shown) is included within an enclosure 500 and anchored by an anchor 500. Accordingly, according to this embodiment, the rack remains fixed relative to the gear assembly 300, which reciprocates as the buoy 100 moves upward and downward according to wave motion.

Figure 3:
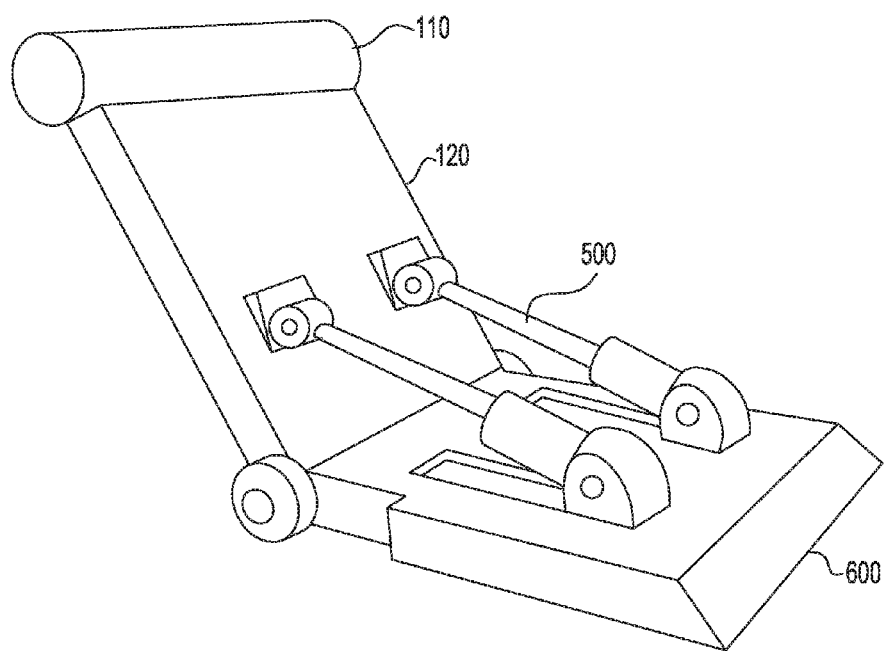
FIG. 3 is a diagram illustrating an energy generating device utilizing wave motion according to another embodiment of the present invention.

FIG. 3 is a diagram illustrating an energy generating device utilizing wave motion according to another embodiment of the present invention.

Referring to FIG. 3, the energy generating device includes a hinged buoy 100, an enclosure 500, and an anchor 600. In contrast to the buoy of FIG. 2, the hinged buoy 100 of FIG. 3 is constructed as a large elongated flap having a first end movably connected to anchor 600 via a hinge and a freely movable opposite end, such that the hinged buoy 100 rotates about the hinge according to the motions of the water. An entire body of the hinged buoy 100 may be buoyant, either through hollow regions and/or use of materials less dense than the surrounding body of water. In addition to, or as an alternative, a less-dense main body 120 of the hinged buoy 100 may be coupled to a float 110 at the freely movable opposite end of the hinged buoy 100 for keeping the hinged buoy 100 afloat.

The enclosure 500 houses a rack and gear assembly. As the hinged buoy 100 rotates according to the motions of the water, the enclosure 500 expands and contracts, while the rack and gear assembly coupled to opposite sides within the enclosure 500 move with respect to each other. The rack and gear assembly operate in a similar manner as described herein with respect to FIG. 2 in order to provide power to a generator (not shown), which may be included within or outside of the enclosure 500. In particular, the gear assembly provides a unidirectional output to the generator according to both expansion and contraction of the enclosure 500 as the hinged 100 rotates upward and downward according to the motions of the water.

In a manner similar to that described with respect to FIG. 2, the electrical energy output by the generator may be used immediately to provide power to an electrical device, to charge an energy storage device, and/or provide electrical energy to be transported to a remote destination, such as a power plant.

Figure 4:
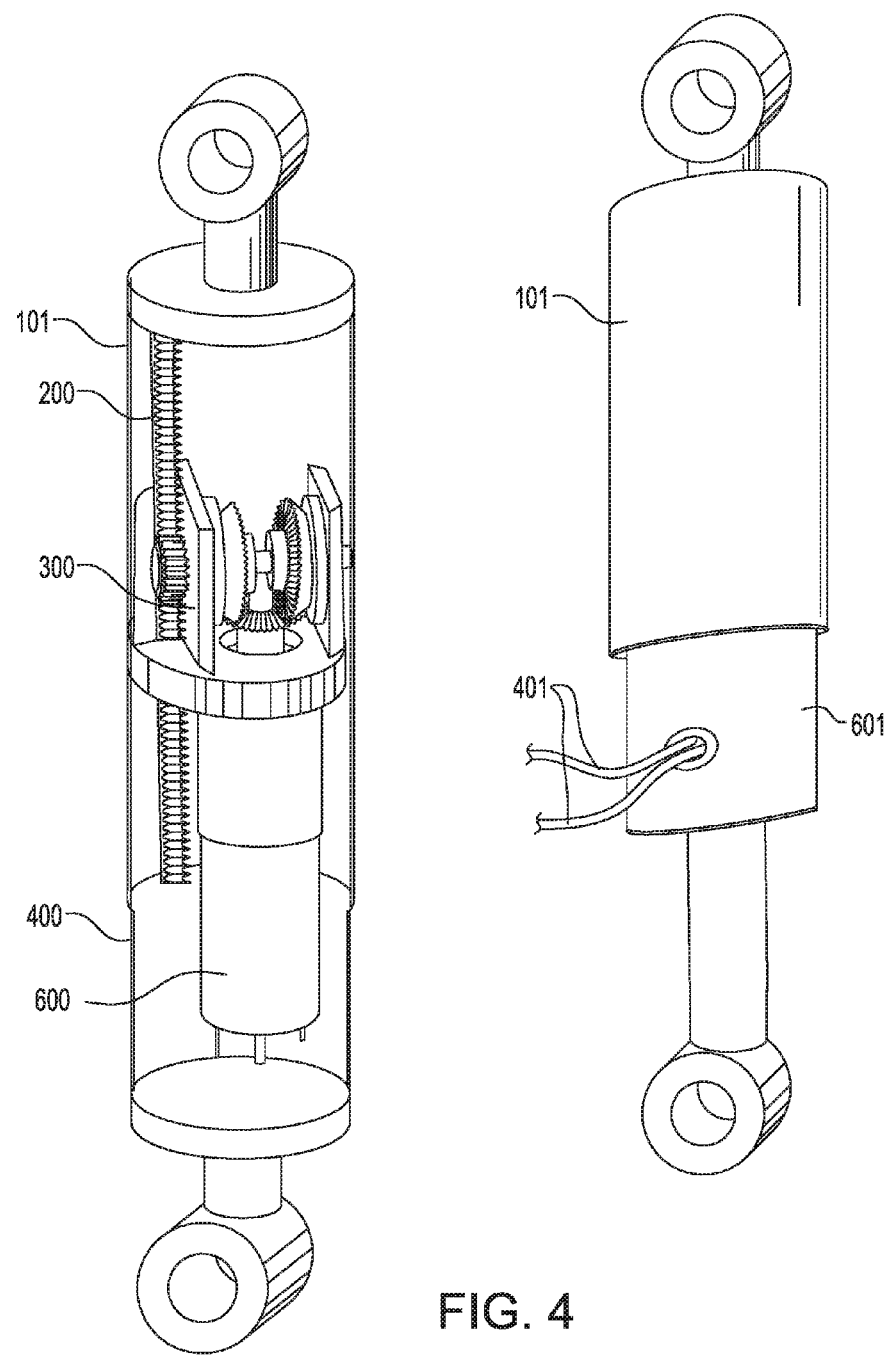
FIG. 4 is an internal view diagram and an external image illustrating an energy generating shock absorber device according to an embodiment of the present invention.

FIG. 4 is an internal view diagram and an external image illustrating an energy generating shock absorber device according to an embodiment of the present invention.

Referring to FIG. 4, the energy generating shock absorber device includes a first outer body 101, a second outer body 601, a rack 200, a gear assembly 300, and a generator 400. The first outer body 101 is hollow and has an open end into which the second outer body 601 is at least partially inserted, to form an outer enclosure of the shock absorber. The first and second outer bodies 101 and 601 are coupled together in a manner that resists compression, such as through a spring, a hydraulic mechanism, or other mechanism (not shown) used in a shock absorber.

The rack 200 and the gear assembly 300 are each coupled to one of the first and second outer bodies 101 and 601 at opposite sides, such that the rack and gear assembly move with respect to each other according to the compression and decompression of the shock absorber.

The gear assembly 300 is constructed such that it outputs rotation in the same direction when the rack 200 reciprocates both upwards and downwards, thereby driving the generator 400 through both of the compression and decompression of the shock absorber.

In a manner similar to that described with respect to FIGS. 2 and 3, the electrical energy output by the generator 400 may be used immediately to provide power to an electrical device, to charge an energy storage device, and/or provide electrical energy to be transported to a remote destination, such as a power plant. Output wires 401 extending from the shock absorber transfer energy output by the generator 400 to another device.

Figure 5:
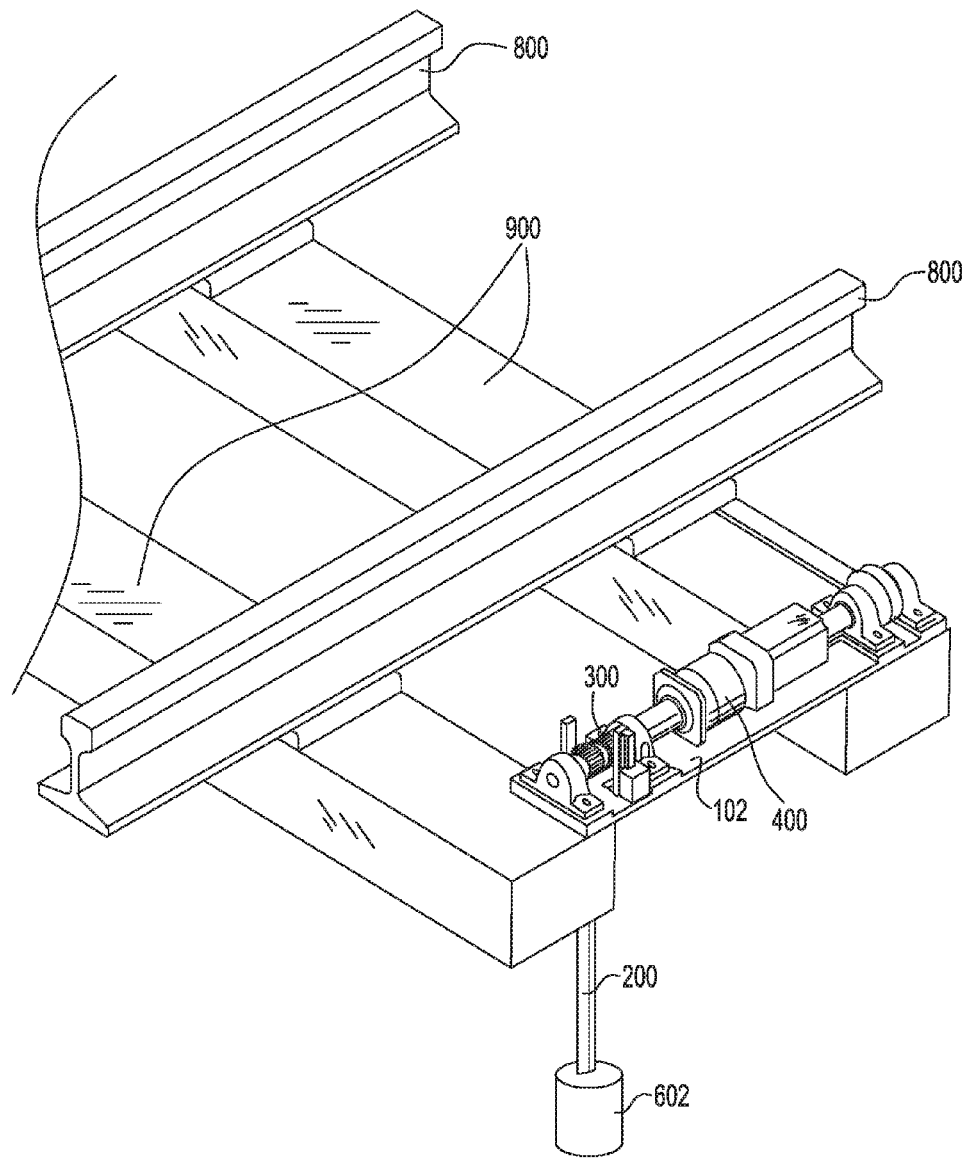
FIG. 5 is a diagram illustrating an energy generating device utilizing rail deformation in a railway system according to another embodiment of the present invention.

FIG. 5 is a diagram illustrating an energy generating device utilizing rail deformation in a railway system according to another embodiment of the present invention.

Referring to FIG. 5, the energy generating device utilizing rail deformation in a railway system includes a rail mount 102, a rack 200, a gear assembly 300, a generator 400, and an anchor 602.

As a railway car (not shown) passes over rails 800, the rails 800, as well as ties 900 deform downwards and upwards due to stress as the weight of the railway cars pass over the rails 800. Gear assembly 300 is coupled to ties 900, such that the gear assembly 300 also moves according to the deformation of the rails 800. Rack 200 is anchored to the ground or other fixed body via anchor 602.

As the gear assembly 300 rises and falls according to the deformation of the rails 800, the gear assembly 300 reciprocates vertically with respect to the rack 200. The gear assembly 300 engages with the rack 200 such that the vertical reciprocation of the gear assembly 300 is translated into a unidirectional rotation (i.e., the output of the gear assembly 300 rotates in a same direction according to both upwards and downwards movement of the rack) used to drive to the generator 400, which outputs electrical energy.

According to an alternate embodiment of the present invention (not shown), the rack 200 is coupled to the rail mount 100, while the gear assembly 300 is coupled to the anchor 602.

Although the rail mount 100 of FIG. 5 is coupled to ties 900, according to another alternate embodiment of the present invention, the rail mount 100 may be coupled directly to the rails 800.

According to embodiments of the present invention, a plurality of energy generating devices may be used at different positions along a railway system in order to generate larger quantities of electricity.

Although a railway system is shown and described with respect to FIG. 5, embodiments of the present invention are also applicable to any transportation system in which an element reciprocates and/or deforms upwards and downwards with respect to a fixed element. For example, embodiments of the present invention may be applied to a movable speed bump in a roadway, as well as elements in a bridge or overpass that move and/or deform according to vehicles, such as cars, passing over such moving elements.

Hereinafter, various racks and gear assemblies according to embodiments of the present invention are described with reference to FIGS. 6-10.

Figure 6:
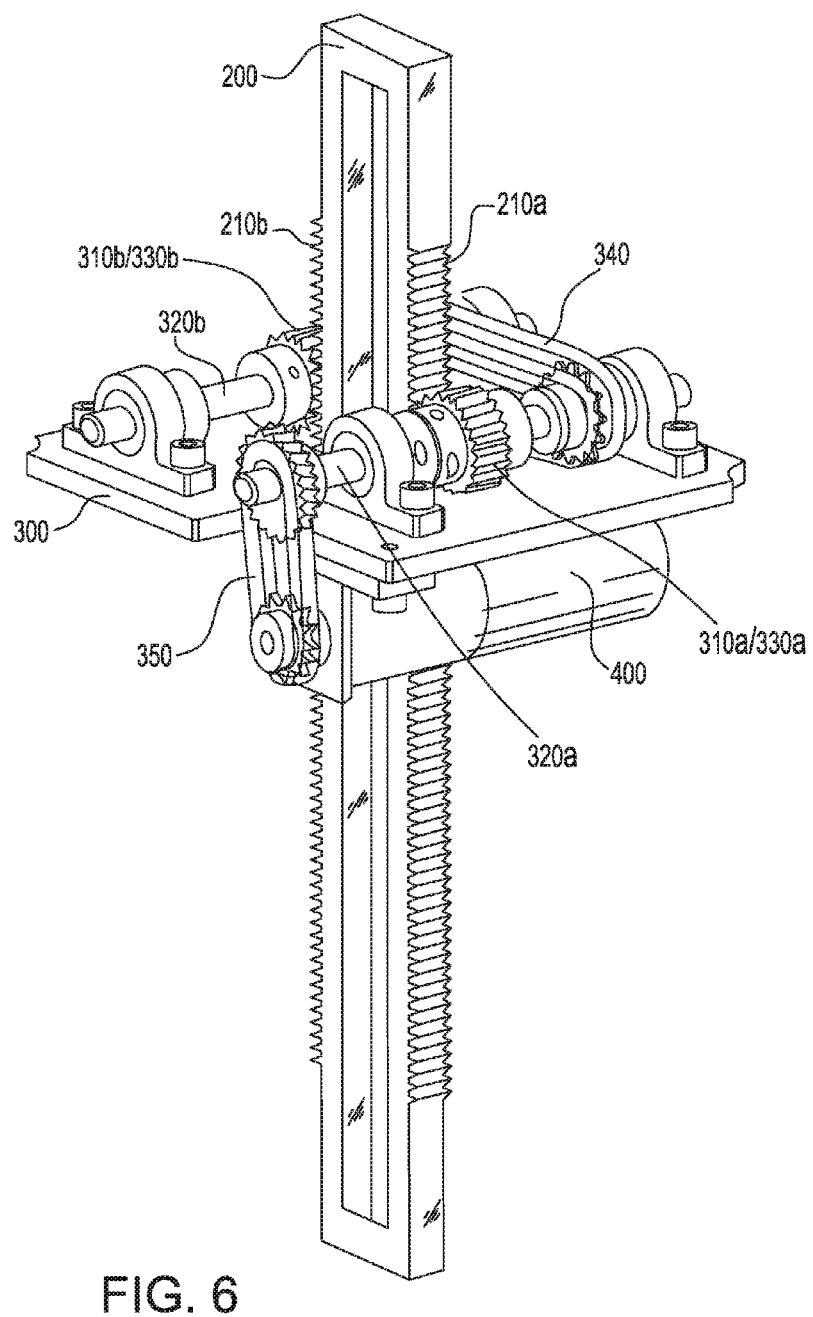
FIG. 6 is a diagram illustrating a gear assembly according to an embodiment of the present invention.

FIG. 6 is a diagram illustrating a gear assembly according to an embodiment of the present invention.

Referring to FIG. 6, the rack 200 engages with the gear assembly 300 via first and second rack gears 210a and 210b positioned on opposite sides of the rack 200, such that the first rack gears 210a are disposed in a first orientation and the second rack gears 210b are disposed in a second orientation opposite the first orientation. The first rack gears 210a engage with a first pinion 310a and the second rack gears 210b engage with a second pinion 310b, such that the first and second pinions 210a and 210b simultaneously rotate in opposite directions to each other as the rack 200 reciprocates.

The first pinion 310a is connected to first pinion shaft 320a via a first roller clutch 330a, while the second pinion 310b is connected to a second pinion shaft 320b via a second roller clutch 330b. The first roller clutch 330a is configured to rotate the first pinion shaft 320a when the first pinion 310a rotates clockwise, but disengages from the first pinion shaft 320a when the first pinion 310a rotates counterclockwise.

Similarly, the second roller clutch 330b is configured to rotate the second pinion shaft 320b clockwise when the second pinion 310b rotates clockwise, but disengages from the second pinion shaft 320b when the second pinion 310b rotates counterclockwise. The second pinion shaft 320b is also connected to the first pinion shaft 320a via a first transfer chain 340. Therefore, when the second pinion shaft 320b is driven clockwise, the second pinion shaft also drives the first pinion shaft 320a clockwise via the first transfer chain 340.

Accordingly, when the rack 200 moves upwards, the first pinion shaft 320a is driven clockwise. Meanwhile, when the rack 200 moves downward, the second pinion shaft 320b is driven clockwise, which, in turn, drives the first pinion shaft 320a clockwise. Accordingly, the first pinion shaft 320a is driven clockwise by both upward and downward movement of the rack 200.

The first pinion shaft 320a is connected to the generator 400 via a second transfer chain 350. Accordingly, the first pinion shaft 320a provides a unidirectional rotational output to the generator 400, which, in turn, outputs a direct current according to both upwards and downwards motion of the rack 200.

Figure 7:
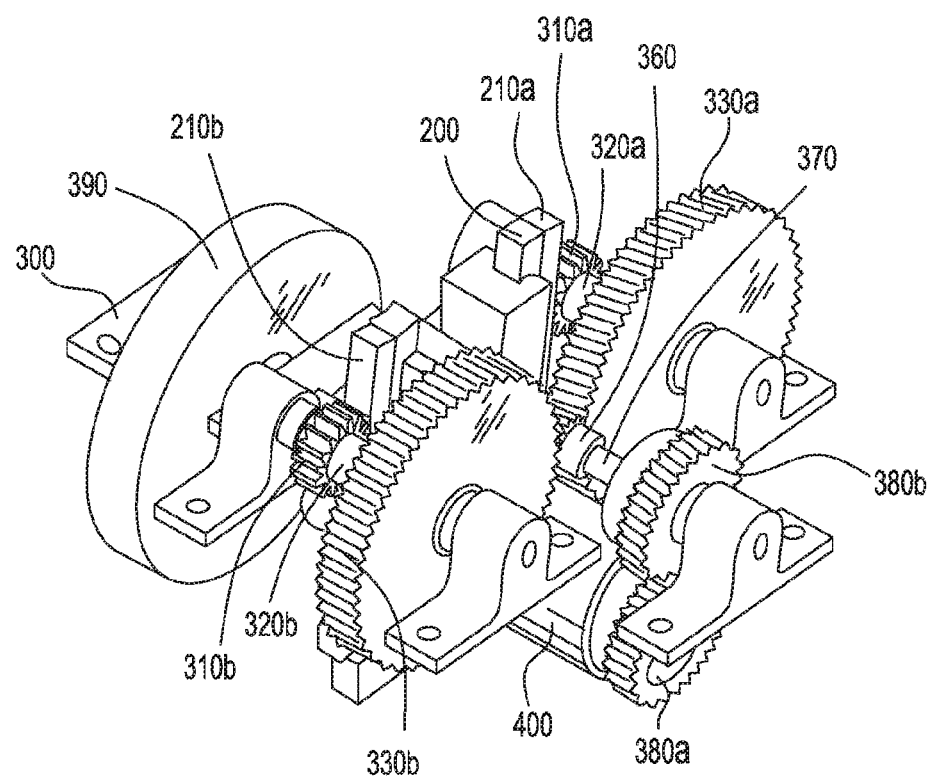
FIG. 7 is a diagram illustrating a gear assembly according to another embodiment of the present invention.

FIG. 7 is a diagram illustrating a gear assembly according to another embodiment of the present invention.

Referring to FIG. 7, the rack 200 engages with the gear assembly 300 via first and second rack gears 210a and 210b positioned on opposite sides of the rack 200, such that the first rack gears 210a are disposed in a first orientation and the second rack gears 210b are disposed in a second orientation opposite the first orientation. In the embodiment of the present invention described with respect FIG. 6, the first and second roller clutches 330a and 330b are included within the first and second pinions 310a and 310b to connect the first and second pinions 310a and 310b to the first and second pinion shafts 320a and 320b. By contrast, in the embodiment according to FIG. 7, the pinions 310a and 310b are directly connected to first and second pinion shafts 320a and 320b respectively. Meanwhile, in the embodiment according to FIG. 7, roller clutches 330a and 330b are provided along the first and second pinion shafts 320a and 320b, respectively, but are positioned independently from the first and second pinions 310a and 310b.

Accordingly, in the embodiment according to FIG. 7, when the rack 200 moves upwards, the first pinion 310a rotates clockwise and drives the first pinion shaft 320a clockwise, while the second pinion 310b rotates counterclockwise and drives the second pinion shaft 320b counterclockwise. Similarly, when the rack 200 moves downwards, the first pinion 310a rotates counterclockwise and drives the first pinion shaft 320a counterclockwise, while the second pinion 310b rotates clockwise and drives the second pinion shaft 320b clockwise.

Therefore, in the embodiment according to FIG. 7, the first and second pinion shafts 320a and 320b are driven in opposite rotational directions with respect to each other when the rack 200 moves upwards and downwards.

The first and second roller clutches 330a and 330b are both engaged with a central gear 360 mounted on a central shaft 370. The first roller clutch 330a is configured such that it is driven by the first pinion shaft 320a when the first pinion shaft 320a rotates clockwise (i.e., when the rack 200 moves upwards), but is disengaged from the first pinion shaft 320a when the first pinion shaft 320a rotates counterclockwise.

Similarly, the second roller clutch 330b is configured such that it is driven by the second pinion shaft 320b when the second pinion shaft rotates clockwise (i.e., when the rack 200 moves downwards), but is disengaged from the second pinion shaft 320*b* when the second pinion shaft 320*b* rotates counterclockwise.

Accordingly, the first roller clutch 330*a* drives the central gear 360 and the central shaft 370 counterclockwise when the rack 200 moves upwards, while the second roller clutch 330*b* drives the central gear 360 and the central shaft 370 counterclockwise when the rack 200 moves downwards. In other words, the central shaft 370 is driven counterclockwise according to both upward and downward movement of the rack 200.

The central shaft 370 is connected to the generator 400 via a first transfer gear 380*a* mounted on the central shaft 370 and a second transfer gear 380*b* connected to the generator 400. Accordingly, a unidirectional clockwise rotation is applied to the generator 400 when the rack 200 moves upwards and downwards. The generator 400 may also be connected to a flywheel 390 in order to stabilize rotation applied to the generator 400.

Figure 8:
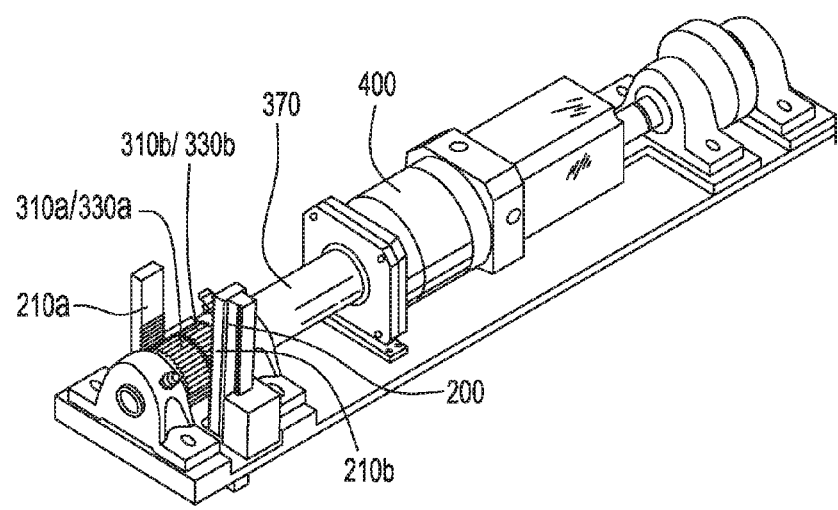
FIG. 8 is a diagram illustrating a gear assembly according to another embodiment of the present invention.

FIG. 8 is a diagram illustrating a gear assembly according to another embodiment of the present invention.

Referring to FIG. 8, first and second rack gears 210*a* and 210*b* are positioned on opposite sides of the rack 200, such that the first rack gears 210*a* are disposed in a first orientation and the second rack gears 210*b* are disposed in a second orientation opposite the first orientation. However, in contrast to the embodiments described with reference to FIGS. 6 and 7, the first and second rack gears 210*a* and 210*b* of the rack 200 face towards each other and are offset with respect to a central shaft 370.

The first pinion 310*a* is aligned with the first rack gear 210*a* and is connected to central shaft 370 via a first roller clutch 330*a* included within the first pinion 310*a*. Meanwhile the second pinion 310*b* is aligned with the second rack gear 210*b* and is connected to the central shaft 370 via a second roller clutch 330*b* included within the second pinion 310*b*. The first roller clutch 330*a* is configured to rotate the central shaft 370 when the first pinion 310*a* rotates clockwise, but disengages from the central shaft 370 when the first pinion 310*a* rotates counterclockwise.

Similarly, the second roller clutch 330*b* is configured to rotate the central shaft 370 clockwise when the second pinion 310*b* rotates clockwise, but disengages from the central shaft 370 when the second pinion 310*b* rotates counterclockwise.

Accordingly, the central shaft 370 is driven clockwise by both upward and downward movement of the rack 200.

The central shaft 370 is directly connected to the generator 400. Accordingly, the central shaft 370 provides a unidirectional rotational output to the generator 400, which, in turn, outputs a direct current according to both upwards and downwards motion of the rack 200.

Figure 9:
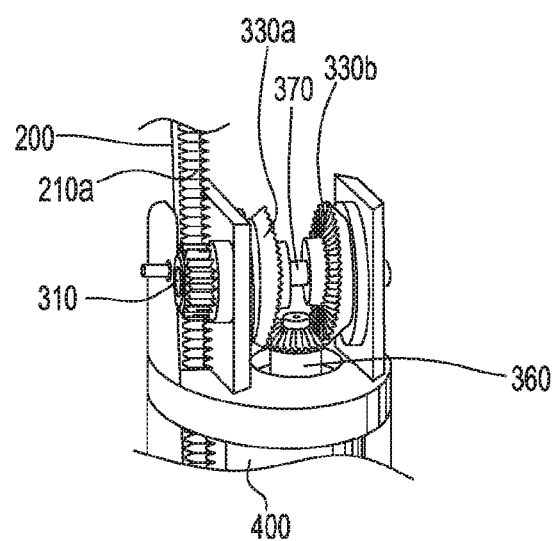
FIG. 9 is a diagram illustrating a gear assembly according to another embodiment of the present invention.

FIG. 9 is a diagram illustrating a gear assembly according to another embodiment of the present invention.

Referring to FIG. 9, the rack 200 includes a single set of rack gears 210 engaging with a single pinion 310 mounted on a central shaft 370. First and second roller clutches 330*a* and 330*b* are mounted on central shaft 370 and are surrounded by bevel gears engaged with opposite sides of a central bevel gear 360. The bevel gears corresponding to the first and second roller clutches 330*a* and 330*b* are disposed in a first orientation and a second orientation opposite the first orientation, respectively, such that the bevel gears face directly towards each other.

When rack gears 210 move upward, the pinion 310 rotates clockwise and drives the central shaft 370 clockwise. Similarly, when rack gears 210 move downward, the pinion 310 rotates counterclockwise and drives the central shaft 370 counterclockwise.

The first roller clutch 330*a* is configured such that it is driven clockwise by the central shaft 370 when the central shaft 370 rotates clockwise (i.e., when the rack 200 moves upwards), but disengages from the central shaft 370 when the central shaft 370 rotates counterclockwise. Meanwhile, the second roller clutch 330*b* is configured such that it is driven counterclockwise by the central shaft 370 when the central shaft 370 rotates counterclockwise (i.e., when the rack 200 moves downwards), but disengages from the central shaft 370 when the central shaft 370 rotates counterclockwise.

When the first roller clutch 330*a* is driven clockwise, the central bevel gear 360 is driven counterclockwise. Since the second roller clutch 330*b* is located on an opposite side of the central bevel gear 360, when the second roller clutch 330*b* is driven counterclockwise, the central bevel gear 360 is also driven counterclockwise. Accordingly, the central bevel gear 360 is driven counterclockwise according to both upward and downward movement of the rack 200.

The central bevel gear 360 is connected to the generator 400. Accordingly, the central bevel gear 360 provides a unidirectional rotational output to the generator 400, which, in turn, outputs a direct current according to both upwards and downwards motion of the rack 200.

Figure 10:
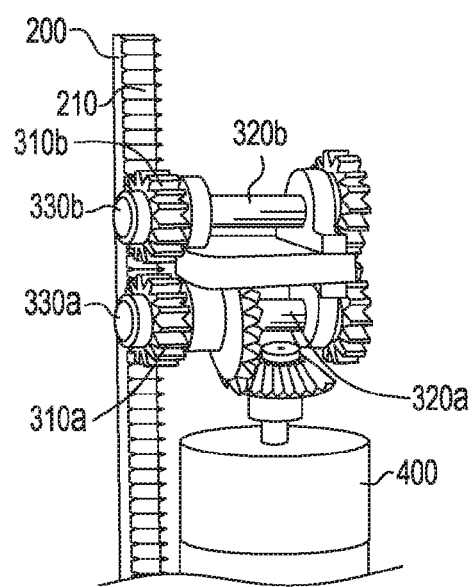
FIG. 10 is a diagram illustrating a gear assembly according to another embodiment of the present invention.

FIG. 10 is a diagram illustrating a gear assembly according to another embodiment of the present invention.

Referring to FIG. 10, the rack 200 includes a single set of rack gears 210 engaging with a first pinion 310*a* and a second pinion 310*b*.

The first pinion 310*a* is connected to a first pinion shaft 320*a* via a first roller clutch 330*a*, while the second pinion 310*b* is connected to a second pinion shaft 320*b* via a second roller clutch 330*b*. The first roller clutch 330*a* is configured to rotate the first pinion shaft 320*a* when the first pinion 310*a* rotates clockwise (i.e., when the rack 200 moves upwards), but disengages from the first pinion shaft 320*a* when the first pinion 310*a* rotates counterclockwise. The first pinion shaft 320*a* also includes a first bevel gear 381*a* engaged with a second bevel gear 381*b*, which is, in turn, engaged with a generator 400.

Similarly, the second roller clutch 330*b* is configured to drive the second pinion shaft 320*b* counterclockwise when the second pinion 310*b* rotates counterclockwise (i.e., when the rack 200 moves downwards), but disengages from the second pinion shaft 320*b* when the second pinion 310*b* rotates clockwise. The second pinion shaft 320*b* also includes a second transfer gear 380*b* engaged with a first transfer gear 380*a* mounted on the first pinion shaft 320*a*. Accordingly, when the second pinion shaft 320*b* is driven counterclockwise, the first pinion shaft 320*a* is driven clockwise via the first and second transfer gears 380*a* and 380*b*.

Accordingly, the first pinion shaft 320*a*, which is driven clockwise according to both upwards and downwards movement of the rack 200, provides a unidirectional rotational output to the generator 400, which, in turn, outputs a direct current according to both upwards and downwards motion of the rack 200.

Any of the gear assemblies according to embodiments of the present invention, such as those illustrated in FIGS. 6-10, for example, may be applied to any of the energy generating devices according to embodiments of the present invention. Also, the relative orientation of the racks, gear assemblies, and generators shown and described in the following examples may be adjusted through use of gears, bevel gears, chains, etc., in order to arrange these parts to fit within a corresponding enclosure. Further, the flywheel 390 shown and described with respect to FIG. 7 may be applied to any of the embodiments of the present invention, through coupling with a generator and/or any shaft, gear, or other mechanism within a gear assembly rotating uni-directionally in order to drive the generator.

While the disclosed method and apparatus have been shown and described with reference to certain embodiments thereof, it will be understood by those skilled in the art that various changes in form and details may be made therein without departing from the spirit and scope of the present invention as defined by the appended claims and equivalents thereof.

What is claimed is:

1. An energy generating device utilizing rail deformation in a railway system, the energy generating device comprising:
    a rail mount coupled to at least one of a railway track and a railway tie such that the rail mount moves upwardly and downwardly according to a deformation of the railway track caused by passing railway cars;
    an anchor mount coupled to a fixed body below the rail mount;
    a rack coupled to one of the rail mount and the anchor mount;
    a gear assembly engaged with the rack and coupled to the other one of the rail mount and the anchor mount, wherein the gear assembly moves upwardly and downwardly with respect to the rack to generate a rotational movement of an output of the gear assembly in a single direction, the rotational movement in the single direction driving a generator; and
    the generator engaged with the gear assembly for receiving the rotational movement output from the gear assembly and outputting a direct current according to the rotational input from the gear assembly.

2. The energy generating device of claim 1, further comprising: a flywheel engaged with the generator for maintaining the rotational movement output from the gear assembly.

3. The energy generating device of claim 1,
    wherein the rack includes first rack gears disposed in a first orientation and second rack gears disposed in a second orientation opposite the first orientation,
    wherein the gear assembly comprises:
    a first pinion engaged with the first rack gears;
    a first pinion shaft;
    a first roller clutch included within the first pinion and coupled to the first pinion shaft for driving the first pinion shaft when the first pinion rotates in a first direction and disengaging from the first pinion shaft when the first pinion rotates in a second direction opposite the first direction;
    a second pinion engaged with the second rack gears;
    a second pinion shaft;
    a second roller clutch included within the second pinion and coupled to the second pinion shaft for driving the second pinion shaft when the second pinion rotates in the second direction and disengaging from the second pinion shaft when the second pinion rotates in the first direction; and
    a transfer mechanism connecting the first pinion shaft to the second pinion shaft for driving the first pinion shaft in the first direction when the second pinion shaft is driven in the second direction, wherein the generator is driven according to the rotation of the first pinion shaft.

4. The energy generating device of claim 1,
    wherein the rack includes first rack gears disposed in a first orientation and second rack gears disposed in a second orientation opposite the first orientation,
    wherein the gear assembly comprises:
    a first pinion engaged with the first rack gears;
    a first pinion shaft coupled to the first pinion;
    a second pinion engaged with the second rack gears;
    a second pinion shaft coupled to the second pinion;
    a central shaft;
    a central gear coupled to the central shaft;
    a first roller clutch coupled to the first pinion shaft and engaged with the central gear, such that the first roller clutch is driven by the first pinion shaft when the first pinion shaft rotates in a first direction and disengages from the first pinion shaft when the first pinion shaft rotates in a second direction opposite the first direction;
    a second roller clutch coupled to the second pinion shaft and engaged with the central gear, such that the second roller clutch is driven by the second pinion shaft when the second pinion shaft rotates in the second direction and disengages from the first pinion shaft when the second pinion shaft rotates in the first direction, wherein the generator is driven according to a rotation of the central shaft.

5. The energy generating device of claim 1,
    wherein the rack includes first rack gears disposed in a first orientation and second rack gears disposed in a second orientation opposite the first orientation,
    wherein the gear assembly comprises:
    a first pinion engaged with the first rack gears;
    a central shaft;
    a first roller clutch included within the first pinion and coupled to the central shaft, for driving the central shaft when the first pinion rotates in a first direction and disengaging from the central shaft when the first pinion rotates in a second direction opposite the first direction;
    a second pinion engaged with the second rack gears; and
    a second roller clutch included within the second pinion and coupled to the central shaft, for driving the central shaft in the first direction when the second pinion rotates in the second direction and disengaging from the central shaft when the second pinion rotates in the first direction, wherein the generator is driven according to the rotation of the central shaft.

6. The energy generating device of claim 1,
    wherein the rack includes first rack gears;
    wherein the gear assembly comprises:
    a central shaft;
    a pinion coupled to the central shaft and engaged with the first rack gears, for driving the central shaft according to a rotation of the pinion;
    a first bevel gear disposed in a first orientation;
    a first roller clutch included within the first bevel gear and coupled to the central shaft such that the central shaft drives the second roller clutch when the central shaft rotates in the first direction and the first roller clutch disengages from the central shaft when the central shaft rotates in a second direction opposite the first direction;
    a second bevel gear disposed in a second orientation opposite the first orientation; and
    a second roller clutch included within the second bevel gear and coupled to the central shaft such that the central shaft drives the second roller clutch when the central shaft rotates in the second direction and the second roller clutch disengages from the central shaft when the central shaft rotates in the first direction;

a central bevel gear coupled to and driven by the first and second bevel gears; and wherein the generator is driven according to the rotation of the central bevel gear.

7. The energy generating device of claim 1, wherein the rack includes first rack gears;

wherein the gear assembly comprises:

a first pinion engaged with the first rack gears;

a first pinion shaft;

a first roller clutch included within the first pinion, such that the first roller clutch drives the first pinion shaft when the first pinion shaft rotates in a first direction and disengages from the first pinion shaft when the first pinion shaft rotates in a second direction opposite the first direction;

a second pinion engaged with the first rack gears;

a second pinion shaft;

a second roller clutch included within the second pinion, such that the second roller clutch drives the second pinion shaft when the second pinion shaft rotates in the second direction and disengages from the first pinion shaft rotates in the first direction; and a transfer mechanism for coupling the first pinion shaft to the second pinion shaft such that the first pinion shaft is driven in the first direction when the second pinion shaft is driven in the second direction; and wherein the generator is driven according to the rotation of the first pinion shaft.

8. The energy generating device of claim 7, wherein the generator is directly coupled to the first pinion shaft.

9. The energy generating device of claim 3, wherein the generator is directly coupled to the first pinion shaft.

10. The energy generating device of claim 3, wherein the generator is indirectly coupled to the first pinion shaft by at least one of a drive chain and a series of gears.

11. The energy generating device of claim 4, wherein the generator is directly coupled to the central shaft.

12. The energy generating device of claim 4, wherein the generator is indirectly coupled to the central shaft by at least one of a drive chain and a series of gears.

13. The energy generating device of claim 6, wherein the generator is directly coupled to the central bevel gear.

* * * * *